United States Patent [19]

Adcock

[11] 4,453,214
[45] Jun. 5, 1984

[54] BUS ARBITRATING CIRCUIT

[75] Inventor: Ralph L. Adcock, Irvine, Calif.

[73] Assignee: Sperry Corporation, New York, N.Y.

[21] Appl. No.: 299,965

[22] Filed: Sep. 8, 1981

[51] Int. Cl.³ .................. G06F 9/18; G06F 13/00
[52] U.S. Cl. ........................................................ 364/200
[58] Field of Search ... 364/200 MS File, 900 MS File

[56] References Cited

U.S. PATENT DOCUMENTS

| | | | |
|---|---|---|---|
| 4,065,809 | 12/1977 | Matsumoto | 364/200 |
| 4,096,571 | 6/1978 | Vander Mey | 364/200 |
| 4,096,572 | 6/1978 | Namimoto | 364/200 |
| 4,131,941 | 12/1978 | Siegel et al. | 364/200 |
| 4,334,288 | 6/1982 | Booher | 364/900 |
| 4,339,808 | 7/1982 | North | 364/900 |

*Primary Examiner*—Gareth D. Shaw
*Assistant Examiner*—Daniel K. Dorsey
*Attorney, Agent, or Firm*—G. Donald Weber, Jr.; Eugene T. Battjer

[57] ABSTRACT

There is described a circuit which controls or arbitrates access to a memory unit among a plurality of data processing units. The circuit also manages pointers to different sections of the memory upon a simple one byte request. The circuit also protects the code of the data processing units from illegal write entries.

22 Claims, 6 Drawing Figures

BUS ARBITRATING CIRCUIT

BACKGROUND

1. Field of the Invention

This invention is directed to control circuits, in general, and to an arbitration and management circuit for use with a plurality of data processing units, in particular.

2. Prior Art

Many management or arbitration techniques are known in the art. In the past, these techniques have typically been performed by software within the existing equipment. However, the software technique is relatively slow and, consequently, expensive. Moreover, the software technique known in the prior art was, to a large degree, a limiting factor with regard to the operation of the entire system because of its relatively slow operation.

Some circuitry which is known in the prior art has generally been quite slow, quite expensive, and generally cumbersome. The known circuitry has also caused difficulties by requiring specific interface requirements which, in addition to adding a relatively slow unit to the system, also significantly increase the cost and reduce compatibility among such systems.

SUMMARY OF THE INVENTION

The arbitration circuit of the instant invention basically consists of two request registers, two bus interfaces and a control circuit. The arbitration circuit is associated with a memory unit which is to be accessed, through the arbitration circuit, by a plurality of data processing units. In order for any of the data processing units to access the memory, a request is placed into the appropriate request register. The arbitration control circuitry then resolves the priority status between the requests placed by the respective processing units. After processing the requests, the arbitration circuit produces a signal which acknowledges the successful or "winning" unit. The winning unit then accesses the data in the memory, via a pointer created by the arbitration circuit. When the unit which has had control wishes to relinquish this control, it must also produce an exit request to sign itself off wherein the arbitration circuit is now ready to perform further functions of arbitration and control.

DESCRIPTION OF A PREFERRED EMBODIMENT

Figure 1:
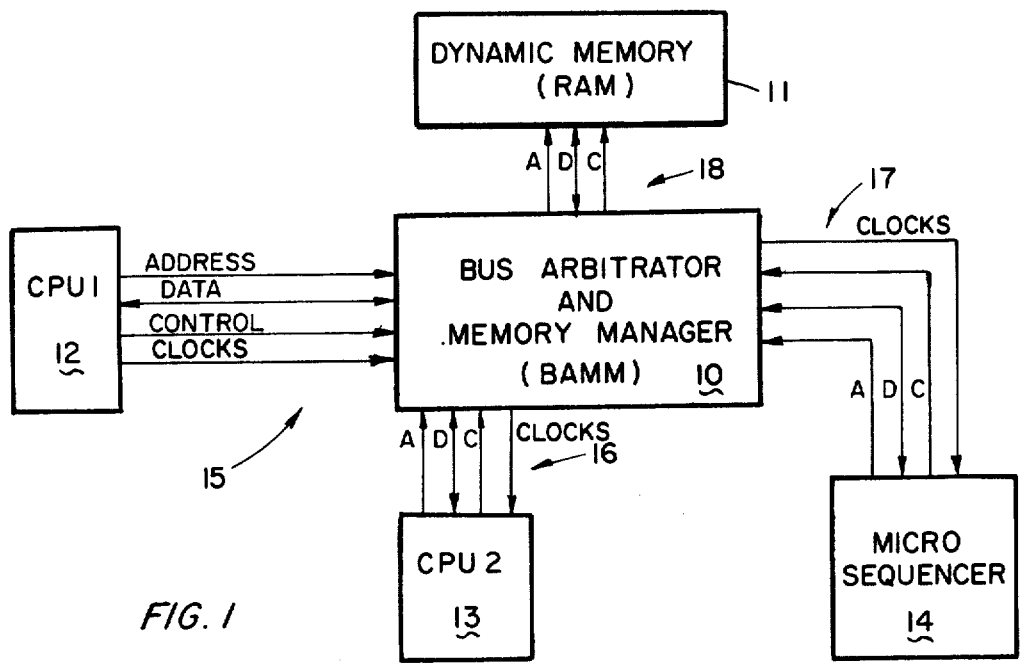
FIG. 1 is a schematic block diagram of a system utilizing the arbitration circuit of the instant invention.

Referring now to FIG. 1, there is shown a schematic representation, in block diagram form, of a system which includes the arbitration circuit of the instant invention. The arbitration circuit 10 is referred to as a bus arbitrator and memory manager (BAMM). The output of the BAMM 10 is connected to a dynamic memory unit 11. In particular, the dynamic memory unit 11 may take the form of a RAM although this is not a specific requirement. BAMM 10 is connected to memory 11 via input/output memory bus 18. Bus 18 includes provision for supplying the address (A), data (D) and control (C) signals to terminals of the RAM 11. Other signals such as clock signals, control signals and the like are also provided. It should be noted that the data bus of memory bus 18 is bidirectional wherein data can be supplied from BAMM 10 to memory 11 and vice versa.

Also connected to BAMM 10 are a plurality of data processing units referred to as CPU 1, CPU 2, and micro-sequencer. CPU 1 is identified as block 12, while CPU 2 is identified as block 13 and the micro-sequencer is identified as block 14. Each of these units is connected to BAMM 10 via the appropriate processor bus 15, 16 or 17, respectively. Again, each of these buses is capable of supplying (or receiving) address, data and control information from the respective processing units to (or from) the BAMM 10 as well as appropriate clock signals.

Briefly, dynamic memory 11 is connected to BAMM 10 and selectively operated thereby. The respective processing units are connected to BAMM 10 and selectively connected to the memory 11 thereby. In the embodiment described herein, CPU 2 (block 13) is arranged to have "automatic access" to memory 11 via BAMM 10 if neither CPU 1 nor micro-sequencer 14 is in control or making a request for control. Once CPU 2 has control, it remains in possession or control of memory 11 via BAMM 10 until one of the other units requests control or access to memory 11.

Conversely, when CPU 1 or micro-sequencer 14 makes a request, BAMM 10 eventually permits access thereby to memory 11 while CPU 2 and the non-requesting unit are effectively disconnected therefrom. In the event of simultaneous requests by both CPU 1 and micro-sequencer 14 to access memory 11, micro-sequencer 14 has priority as will be described hereinafter.

Figure 2:
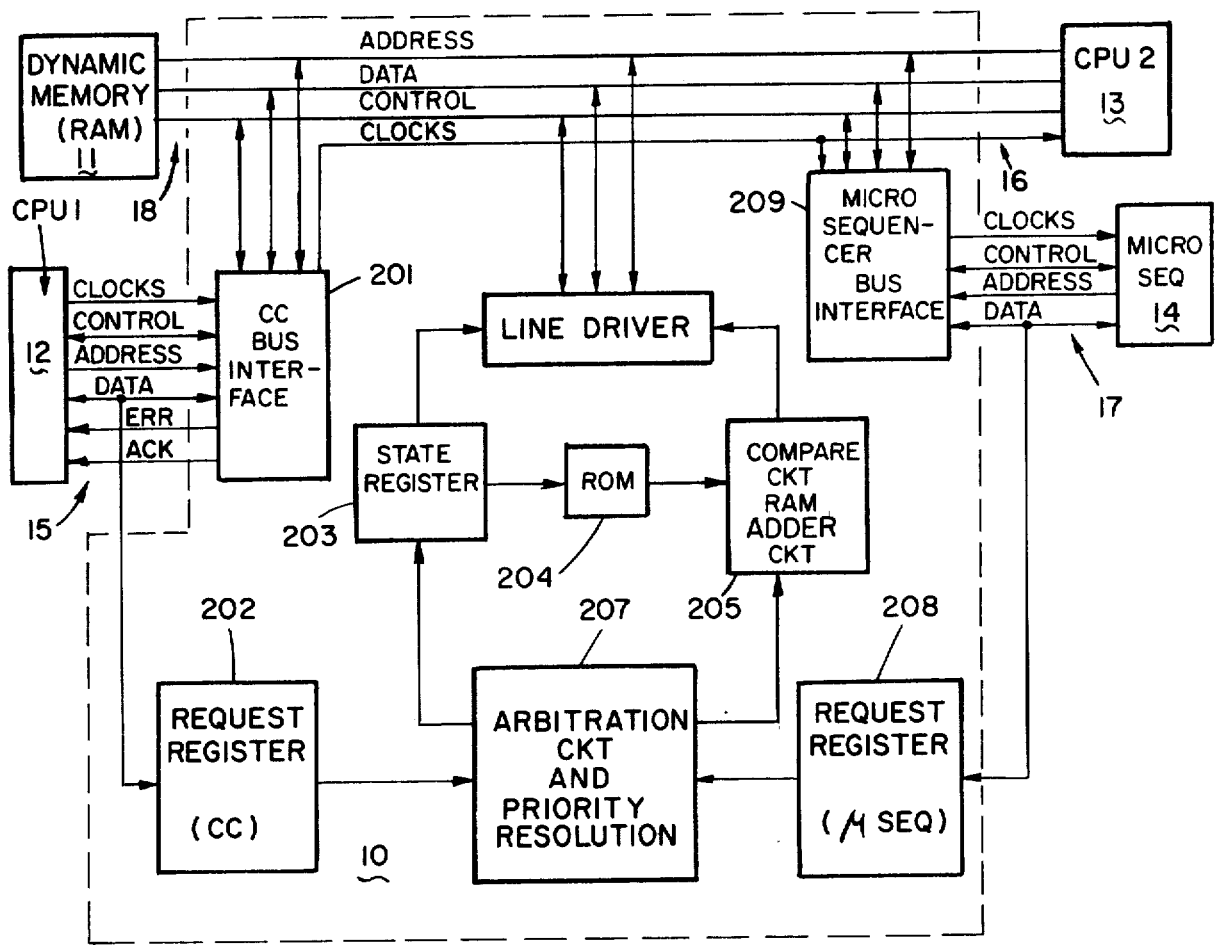
FIG. 2 is a more detailed schematic block diagram of the arbitration circuit of the instant invention.

Referring now to FIG. 2, there is shown a more detailed schematic block diagram of BAMM 10. In this figure, the dynamic memory 11, CPU 1, CPU 2 and micro-sequencer 14 are shown. BAMM 10 is also shown connected to each of these units. The details of BAMM 10, per se, are included within the dashed outline. Thus, a control circuit bus interface 201 is connected between bus 15 of CPU 1 and memory 11 via memory bus 18. Likewise, bus 17 of micro-sequencer 14 is connected to micro-sequencer bus interface 209 which is further connected to memory 11 via bus 18. CPU 2 is connected by bus 16 directly to memory 11 via memory bus 18 as well as to the internal components of BAMM 10, as shown.

Bus 15 includes the acknowledge (ACK) signals and the error (ERR) signals. In addition, a portion of bus 15 is connected to request register 202 which is associated with CPU 1. Likewise, a portion of bus 17 is connected to request register 208 which is associated with a micro-sequencer 14. Each of the request registers 202 and 208 are connected to an arbitration circuit 207 which operates to arbitrate and establish priority of memory access requests from the several units.

The outputs of arbitration circuit 207 are connected to the input of state register 203 and to an input of compare circuit 205. In addition, state register 203 produces output signals which are supplied to line driver 206 and to ROM 204 which will be discussed subsequently. The output of ROM 204 is connected to compare circuit 205 which includes a comparison circuit, a RAM and counter circuitry. The output of circuit 205 is connected to an input of line driver 206. The outputs of line driver 206 are connected to the memory bus 18 which is, as noted above, also connected to memory 11, bus interfaces 201, 209 and CPU 2.

In operation, it is assumed that CPU 2 has control of memory 11 inasmuch as CPU 2 is connected to the memory and operating in conjunction therewith. At some point, either CPU 1 or micro-sequencer 14 (or both) supplies the appropriate request signal which indicates that CPU 1 and/or micro-sequencer 14 desires to interface with dynamic memory 11. The access request information from these processors is supplied to the associated interfaces 201 or 209, respectively. Likewise, the access request from CPU 1 is supplied to request register 202 while the access request from micro-sequencer 14 is supplied to request register 208. Each of these registers supplies a signal to arbitration circuit 207.

The first request register which supplies a signal to arbitration circuit 207 causes signals to be supplied thereby to the remainder of the circuit. In the event that there is a tie, i.e. request register 202 and request register 208 both supply signals to arbitration circuit 207 at the same time, the arbitration circuit is arranged to grant micro-sequencer 14 priority over CPU 1 and, thus, access to dynamic memory 11, as will be discussed. Moreover, whenever either one of the request registers has achieved control over the circuit via the selection by arbitration circuit 207, the non-selected register is, effectively, locked out of the circuit.

Once the request register prioritizing is completed, the request signal is produced by arbitration circuit and supplied to state register 203 and compare circuit 205. The state register 203 then supplies signals to ROM 204. The signals supplied to ROM 204 are produced as the result of several states of operation in the state register 203 as described in detail hereinafter. Each of the signals from state register 203 causes ROM 204 to produce output signals which are supplied to compare circuit 205. The compare circuit 205 which comprises the compare circuit RAM and the address circuit, as noted above, is driven or gated in accordance with the output signals from ROM 204. Circuit 205 supplies appropriate signals to line driver 206 along with signals from state register 203 as noted above. The combination of these input signals causes line driver 206 to produce an output signal which is supplied to the address portion of the memory bus 18. The address signal then is supplied to dynamic memory 11 and selects the particular address which is to be accessed in the memory. Therefore, the winning or selected requester, i.e. CPU 1 or micro-sequencer 14, is now connected via the respective bus interface 201 or 209 and the memory bus 18 to the particular address which has been selected in dynamic memory 11. When the address is selected, the data in the memory is also accessible. It should be noted that, depending upon the control functions, the data can be either read from or written into dynamic memory 11 from the appropriate processing unit.

In the particular embodiment shown, it must be noted that the winning processing unit is, more particularly, seeking either the last full or the next empty data block in the RAM. This block is, in this embodiment, defined to be equivalent to 32 bytes of information. In other words, the BAMM 10 may be considered to be arbitrating and managing eight queues of information. In the transmit queues, (four of the eight) CPU 1 attempts to write information into the next empty block, while micro-sequencer 14 attempts to read information from the last full block. Conversely, in the receive queues the situation is reversed relative to the operation of the processors. The queues reside in the dynamic memory 11 which can also be accessed directly, using a different addressing code, wherein the pointer selects the precise block of data which is accessed and moved accordingly.

Figure 3:
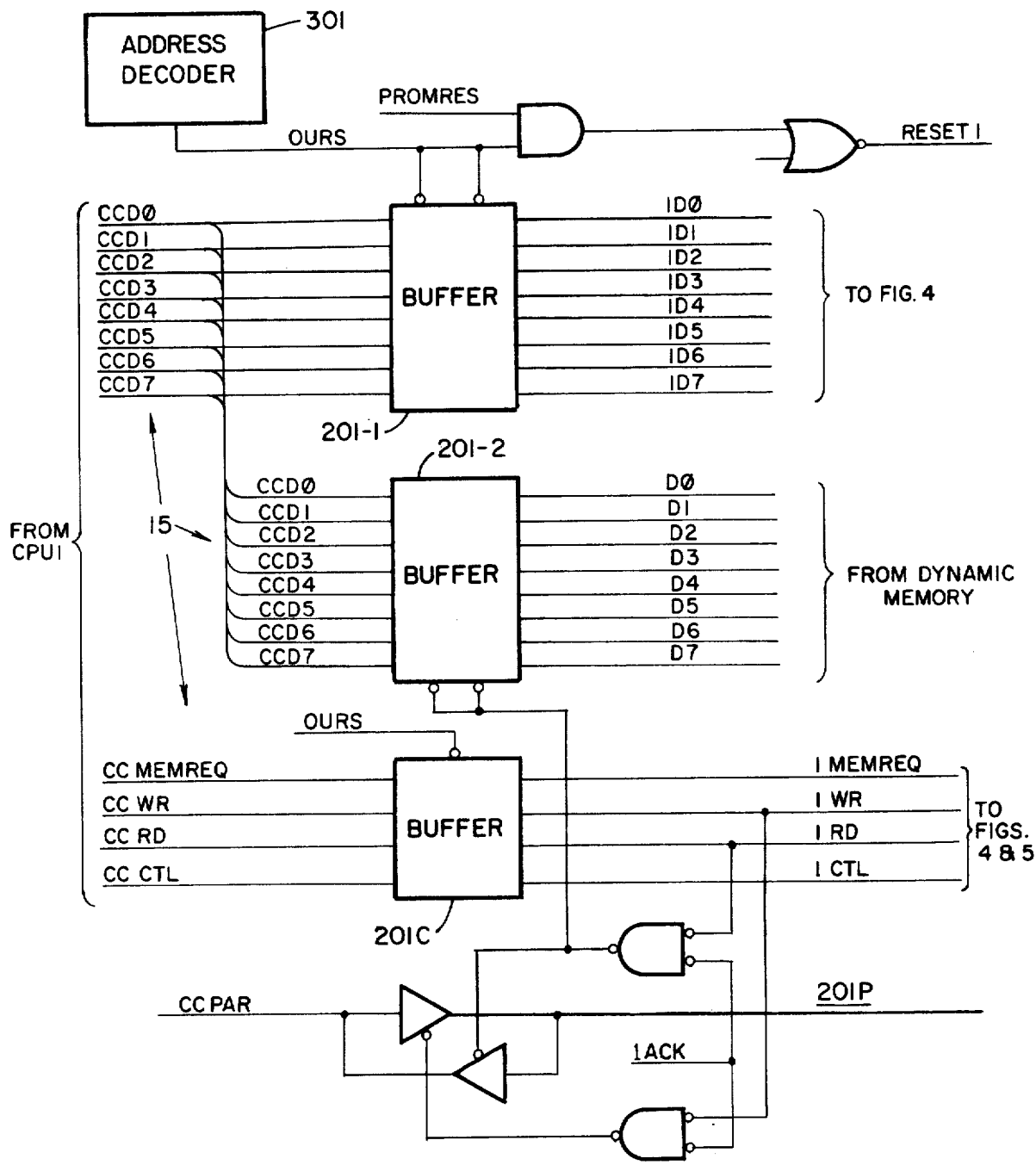
FIG. 3 is a schematic diagram of CPU 1 interface circuitry portion of the instant invention.
Figure 4:
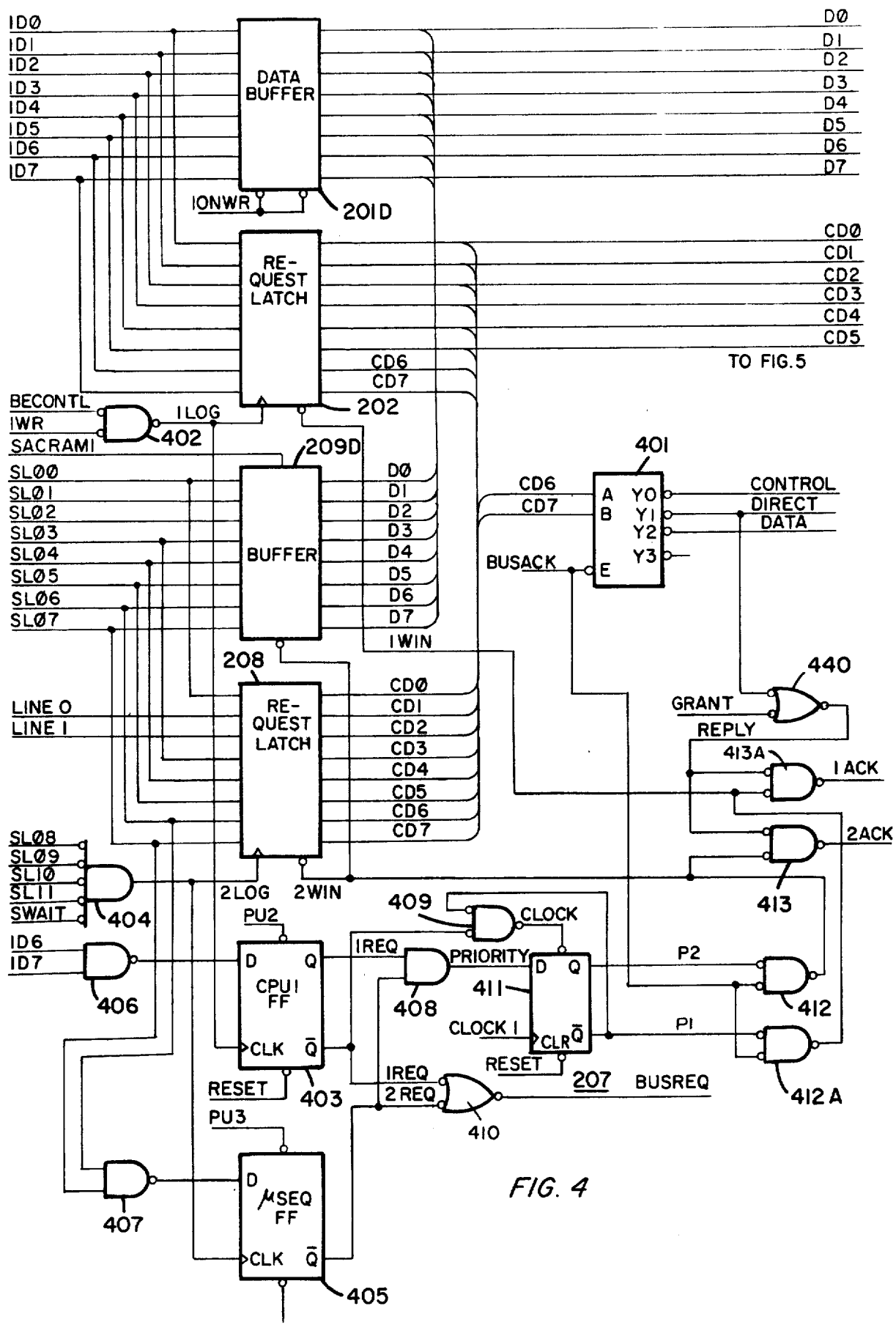
FIG. 4 is a detailed schematic diagram of the data multiplexer and priority arbitrator circuitry of the instant invention.

Referring now to FIG. 3, there is shown a schematic representation of portions of the control bus interface 201 shown in FIG. 2. In particular, there is shown a portion of interface bus 15 which is connected to CPU 1. The bus 15 is also connected as an input to buffer 201-1 which receives the control computer data signals CCD0 through CCD7. Also, connected to supply signals to buffer 201-1 is address decoder 301 which selectively enables buffer 201-1 to transfer signals therethrough. Signals which are transferred through buffer 201-1 are provided at the output terminals thereof as data signals 1D0 through 1D7. These signals are supplied to buffer 201D and latch 202, as shown in FIG. 4 and described hereinafter. The address decoder signals supplied by address decoder 301 are produced elsewhere in the control computer and select the address of the data which is to be operated upon.

It is noted that the buffer 201-2 has the output terminals thereof connected to bus 15 and, thus, to CPU 1. The output signals produced by buffer 201-2 are, respectively, the signals CCD0 through CCD7. The input terminals of buffer 201-2 are connected to receive the data signals D0 through D7 through the memory data bus 18 as suggested in FIG. 2. Buffer 201-2 is used when the CPU 1 is reading data from dynamic memory 11. Conversely, buffer 201-1 is used when CPU 1 is writing data into dynamic memory 11.

In a similar fashion, the control signals from computer CPU 1 are applied to buffer 201C along with the control signal OURS which is supplied by address decoder 301. The buffer 201C transmits the control signals in accordance with the application of the address decoded signals OURS. The output signals 1MEMREQ 1WR, 1RD, and 1CTL are supplied to FIGS. 4 and 5 as described hereinafter. In addition, the signals 1WR and 1RD are also supplied to the parity control circuitry 201P which is utilized to control and detect the parity of the system. The parity checking portion of the circuit is not described as a portion of the invention, per se, although parity checking is a highly desirable feature of the operational circuitry.

Referring now to FIG. 4, there is shown a schematic diagram of the portions of the circuit shown in FIG. 2 which are identified as the request registers 202 and 208, as well as the arbitration and priority resolution circuit 207.

Again, the input data signals ID0 through ID7 are obtained from the CPU 1 data bus via buffer 201-1. These signals are supplied to data buffer 201D, which is similar in nature to buffer 201-1. The signals D0 through D7 produced at the output terminals of buffer 201D are supplied to the memory data bus 18 and, thence, to the dynamic memory 11.

Figure 5:
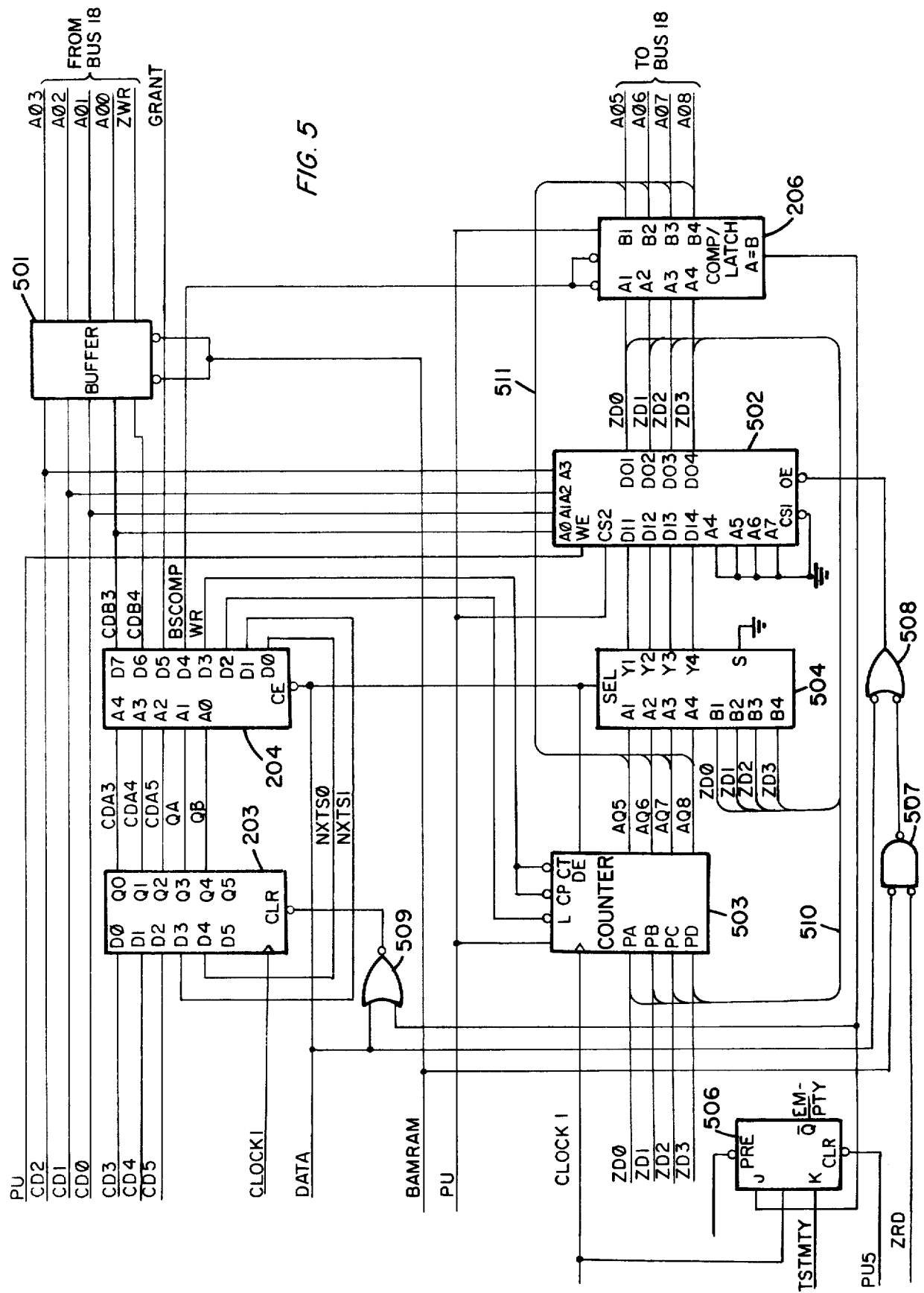
FIG. 5 is a detailed schematic diagram of the state machine circuitry of the instant invention.

In addition, the input data signals ID0 through ID7 are also supplied to respective input terminals of request latch 202 which is similar to request register 202 in FIG. 2. The output signals CD0 through CD5 are supplied to the state register 203 of the control circuitry 205 as shown in FIG. 5. The output signals CD6 and CD7 from latch 202 are supplied to the memory select circuit 401 which is described subsequently. The control signal 1ONWR is also supplied to data buffer 201D by control circuitry in CPU 1, wherein data information is transferred through buffer 201D. Control signals BECONTL and 1WR are supplied from CPU 1 to control operation of latch 202. The BECONTL signal is an address signal from the CPU 1 which is decoded elsewhere in the circuit while the 1WR signal is supplied by the control circuitry 201C shown in FIG. 3.

The BECONTL and 1WR signals are supplied to separate inputs of OR gate 402 such that any high input signal produces a high level output signal which effectively loads the input signals ID0 through ID7 into the request latch. The output of OR gate 402 is also connected to an input of CPU flip-flop 403 as will be described hereinafter. The signal 1WIN is selectively supplied to request latch 202 to permit the signals stored therein to be gated out as the output signals CD0 through CD7.

In similar manner, the data signals on the micro-sequencer 14 data bus 17 are supplied as the signals SL00 through SL07. These signals are supplied to the input terminals of buffer 209D along with the control signal SACRAM1 which permits the signals to be stored therein. The signal 2WIN is selectively applied to buffer 209D to permit the signals to be gated out as data signals D0 through D7 which are connected to data bus 18 as shown.

Also, the data signals SL0 and SL03 through SL07 are applied to request latch 208 along with the code signals LINE 0 and LINE 1. Again, the request latch 208 is connected to produce output signals CD0 through CD7 which are connected to the output lines CD0 through CD5 which are applied to circuits in FIG. 5 and the output signals CD6 and CD7 which are connected to the memory select circuit 401. The loading operation of latch 208 is controlled by NOR gate 404 which receives a plurality of signals from micro-sequencer 14 and which are appropriately coded to selectively activate request latch 208 to receive signals from the micro-sequencer data bus. In addition, the output signal from NOR gate 403 is connected to an input of micro-sequencer flip-flop 405 as will be described hereinafter.

Briefly then, signals are supplied on the CPU 1 data bus and the micro-sequencer data bus. These data signals are supplied to the inputs of buffer 201D and request latch 202 (in the case of CPU 1) and to buffer 209D and request latch 208 (in the case of micro-sequencer 14). With the application of the appropriate control signals, data is passed through either buffer 201D or buffer 209D, mutually exclusively, to the memory data bus. Similarly, depending upon the application of the appropriate control signals, the respective request latches 202 and 208 will selectively store therein information supplied along the appropriate data input line. Likewise, with the application of the appropriate output control signal, the request latches 202 or 208 will, mutually exclusively, produce the output signals CD0 through CD7.

The control of the request latches and the associated buffers is handled by the arbitration and priority resolution circuit 207. The arbitration circuit 207 includes CPU 1 flip-flop 403 and micro-sequencer flip-flop 405 which were noted above. Each of these flip-flops receives an appropriate signal from OR gate 402 or NOR gate 404 as described. That is, when the gates 402 and 404 are activated to supply signals to the respective request latches and thereby cause the latches to be loaded, signals are also supplied to the respective flip-flops to determine the priority (i.e. arbitration of priority) between the two requesting units (i.e. CPU 1 and/or micro-sequencer 14).

Initially, assume that CPU 1 has provided information to request latch 202. This information can be supplied to the latch for many reasons. In the event that CPU 1 wants to access the dynamic memory, it is also required that the control signals BECONTL and 1WR supplied to AND gate 402 are both low-level signals. This causes gate 402 to produce a low-level output signal 1L06 which is supplied to latch 202. The edge of this signal latches the input data signals ID0 through ID7 therein. In addition, this same signal is supplied to the clock terminal of flip-flop 403. At the same time, one or both of signals ID6 and ID7 are low-level signals and are supplied to the inputs of AND gate 406. This produces a high-level signal which is applied to the D terminal of flip-flop 403. With the application of the high-level signal to input D and the application of the control signal from gate 402 to flip-flop 403, the high-level signal at terminal D is transferred to the Q output terminal of flip-flop 403. At the same time, a low-level signal is produced at the $\overline{Q}$ output terminal of flip-flop 403. The high-level output signal at the Q terminal of flip-flop 403 is applied to one input of AND gate 408 while the low-level signal from the $\overline{Q}$ terminal of flip-flop 403 is supplied to inputs of OR gate 409 and, as well, AND gate 410. For purposes of explanation, it is assumed that the $\overline{Q}$ terminal of flip-flop 405 produces a high-level signal which is applied to the other input terminals of gates 408 and 410. Gate 410 produces the output signal BUSREQ in response to the low-level signal at the $\overline{Q}$ terminal of flip-flop 403.

The bus request signal BUSREQ is sent to CPU 1 which is normally connected to dynamic memory 11 unless CPU 1 or micro-sequencer 14 is requesting access to the memory. The bus request signal will, effectively, disconnect CPU2 when CPU2 receives the bus request signal and acknowledges receipt thereof. When CPU2 receives the bus request signal and is ready to relinquish control over the dynamic memory, CPU2 produces the bus acknowledge signal BUSACK which goes low and is supplied to the other inputs of gates 412 and 412A.

Similarly, gate 408 produces a high-level signal which is supplied to the D input terminal of flip-flop 411. With the application of the CLOCK1 signal, the high-level signal at the input terminal D is transferred to the output terminal Q of flip-flop 411 and a low-level signal is produced at the $\overline{Q}$ terminal of flip-flop 411. The low-level signal P1 at the $\overline{Q}$ terminal of flip-flop 411 is supplied to OR gate 412A along with the low-level BUSACK (bus acknowledge) signal. The gate 412A then produces a low-level signal 1WIN which indicates that CPU1 has been granted priority. The 1WIN signal is supplied to request latch 202 to enable the request latch to gate the signals therefrom into the state register 203. In addition, the 1WIN signal is supplied to AND gate 413A which selectively produces the 1ACK signal which indicates that CPU1 has control over the requested portion of memory 11. That is, gate 413A produces the 1ACK signal in response to the 1WIN signal and the output of OR gate 440 which is generated by either the GRANT signal described elsewhere or the DIRECT signal from MUX 401.

If, now, it is assumed that the micro-sequencer 14 seeks control of the circuit, the micro-sequencer input signals are signals SL100 through SL07 and SWAIT. In particular, the signals SL00 through SL07 are applied to buffer 209D. Concurrently, signals SL00 and SL03 through SL07 are applied to the request latch 208 along with the input signals LINE 0 and LINE 1. The buffer 209D provides the output signals D0 through D7 which are connected to the memory data bus. Request latch 208 provides the output signals CD0 through CD7 which are connected to the state register 203 (in FIG. 5) and the MUX 401 as noted relative to the CPU1 channel operation. In addition, the control signal SACRAM1 is supplied to an input terminal of buffer 209D to control the operation thereof. The signals SL08 through SL11 and SWAIT are applied to gate 404 which supplies signals to the clock terminal of request latch 208 and to the clock terminal of the micro-sequencer flip-flop 405. In addition, the signals SL06 and SL07 are supplied to the inputs of gate 407.

In order for the micro-sequencer to take control, all of the signals supplied to gate 404 must be low-level signals in order to produce a high-level output signal 2LOG which causes the signals supplied to request latch 208 to be latched therein. At the same time, the signal produced by gate 404 is supplied to the clock terminal of flip-flop 405. In the event that one or both of the signals SL06 and SL07 applied to AND gate 407 are low-level signals, a high-level signal is supplied to the D input terminal of flip-flop 405. With the application of the control signal from gate 404, the high level signal at terminal D is transferred as a low level signal to the $\bar{Q}$ output terminal of flip-flop 405. This output at the $\bar{Q}$ terminal causes the AND gate 410 to produce a low level output signal BUSREQ which shows that the bus request has been accepted, as described, supra.

At the same time, the low level $\bar{Q}$ signal from flip-flop 405 is connected to one input of AND gate 408. This low level input signal causes gate 408 to produce a low level output signal which is supplied to the D input terminal of priority flip-flop 411. The output signal from gate 408 is latched into flip-flop 411 with the application of the clock signal CLOCK 1. This causes the Q output terminal of flip-flop 411 to produce a low level output signal while the $\bar{Q}$ output terminal produces a high level signal. The low level signal from terminal Q is supplied to an input of OR gate 412 while the high level signal at terminal $\bar{Q}$ is supplied to an input of OR gate 412A. In response to these signals, gate 412 produces the low level 2WIN signal which activates latch 208. Conversely, gate 412A produces the high level 1WIN signal which inactivates latch 202.

As a result, gate 412 produces a low level output signal 2WIN. The low level 2WIN signal is supplied to request latch 208 which is activated thereby and produces the output signals CD0 through CD7 which are supplied to the state register (see FIG. 5) and the MUX 401. The information from request latch 208 is then applied to and latched into the state register 203 wherein prom 204 is activated and produces the GRANT signal and so forth as described previously.

Reference is now made to FIG. 5, which is directed to the RAM 502 compare circuit 206 (with output driver), counter 503 and MUX 504 and the like included in circuit 205 in FIG. 2. In addition, other portions of the circuitry shown in FIG. 2 are shown, in greater detail, in FIG. 5. For example, state register 203 is connected to receive a portion of the data output from request latch 202 in FIG. 4. In particular, the data signals CD3 through CD5 are provided to state register 203 and represent the request information relative to CPU1. The output signals CDA3 through CDA5 which represent the output of the state register supply inputs of memory 204 which can be a ROM or PROM. Also, the signals QA and QB are provided to state register 203 from memory. As a function of these input signals, ROM 204 produces output signals CDB3 and CDB4 which are supplied to the memory 502 along with data signals CD0 through CD2 from request latch 202 in FIG. 4. As well, the data signals CDB3 and CD0 through CD2 are applied, as inputs, to pointer memory 502. PROM 204 also produces output signals NEXT STATE/0 (NXTS0) and NEXT STATE/1 (NXTS1) which are returned, as inputs, to state register 203. Other input signals produced by PROM 204 are the bus load (BSLOAD) and bus increment (BSINC) are provided as control signals to counter (adder) 503. The bus compare (BSCOMP) signal supplied from PROM 204 to the compare circuit 206 while the GRANT signal is produced by PROM 204 to indicate that one of the requesting units has been granted access to the dynamic memory 11.

The CPU latch 501 also produces output signals from address signals $A\emptyset 0$ through $A\emptyset 3$ and the read/write signal ZWR supplied by address bit 18. Also, the input signals from CPU2 used for test and initialization, namely, signals ZD0 through ZD3, are applied to input terminals of counter 503. The output terminals of counter 503 supply the signals $A\emptyset 5$ through $A\emptyset 8$ and are connected to the outputs of compare circuit 206 as well as to inputs of multiplexer 504. Other inputs of multiplexer 504, namely, input signals $ZD\emptyset$ through ZD3 are supplied at the output terminals of memory 502 along with being supplied to the input of comparator 206. The output terminals of MUX 504 are connected to input terminals of memory 502 to supply information thereto. Gates 507 and 508 are used to provide control signals to memory 502 as described hereinafter. Likewise, flip-flop 506 is connected to produce the output signal EMPTY which indicates an empty condition in the queue stored in memory 502 as described hereinafter.

In the basic or simple operation, the coded request signals CD3 through CD5 are supplied directly to register 203. The signals from register 203 are supplied directly to PROM 204 and select one of the four-bit pointers in memory 502. The four-bit pointer, (i.e. signals ZD0 through ZD3) is supplied to the compare portion of register 206. At the same time, the PROM 204 has produced or set the GRANT bit which effectively grants access to the memory by whichever requesting unit was successful in the priority arbitration noted in the discussion relative to FIG. 4. Thus, the four bits from the memory 502 are controlled by the bypass bits CD0 through CD2 which are received directly from the request latch 202 or 208 in FIG. 4, as well as the control signals CDB3 and CDB4 from PROM 204. It should be understood that the signal CDB4 is actually the write enable (WE) control signal which permits the other signals to select the location or address of the appropriate bits in memory 502. The signals in the compare circuit 206 are then transferred to the second portion of register 206. From there, signals are supplied, as part of the address bits, directly to dynamic memory 11 along address bus 18. That is, bits A∅5 through A∅8 from register 206 are combined with bits A∅∅ to A∅3 which are produced by latch 501.

It should be noted that the memory 502 is initially set by CPU2 wherein the queues are initialized so that the put or get pointers indicate that there is an empty or an available memory portion provided. That is, CPU2 has direct access to the memory 502 via the connections 510 wherein the CPU can initialize the pointer values.

In a more complex operation, memory 502 actually represents eight circular queues. These circular queues are maintained and controlled by the pointers in the memory. The pointers are thus "put" or "get" pointers for each queue. Moreover, it is necessary to obtain the "next put" or "next get" pointers.

The "put" pointer is used to indicate the location of the next empty slot or storage area in the memory. That is, the next available area for inserting information is designated. In a similar manner the "get" pointer is used to indicate the first available entry which has valid data wherein information is retrieved from the memory.

The "next put" pointer is obtained by the state register indexing the memory so that it points to the next empty block (in this case a block is 32 bytes) in memory 11. The "next get" pointer is obtained in a similar fashion for the get function.

These pointers are indexed by the counter circuitry. In particular, the bits CD0, CD1 and CD2 actually determine which of the pointer sets is to be obtained. The CDB3 bit from PROM 204 controls whether it is a put or a get function.

In the situation where the "next get" is to be provided, the bits CD3, CD4 and CD5 are appropriate. These bits are specially encoded to perform the appropriate function. The PROM 204 operates upon the signals supplied thereto by register 203 and selects the current pointer which is being utilized. This pointer is loaded into counter 503 via RAM 502 and conductors 510. In addition, the pointer is loaded into the compare portion of register 206. At this time, PROM 204 cycles through its repertoire and, effectively, indexes counter 503 to the next value. The output of counter 503 is supplied to the compare portion of register 206 via lines 511 and compared with the value of the pointer supplied to the compare portion via memory 502. That is, the opposite pointers (i.e. put versus get), are supplied to the compare and counter registers by PROM 204 cycling through its repertoire and supplying the appropriate read signals to memory 502. Thus, this operation permits the indexed counter signal from counter 503 to be compared with the current pointer being operated upon according to memory 502. If the put and get pointers are ever equal in a put condition, the pointer equality represents a full queue. Conversely, an equality in a get condition indicates an empty queue.

In either case, an equality of the current point from memory 502 and the indexed pointer value from counter 503 produces the signal "A=B" at the output of register 206. This signal is supplied to gate 509 and, to the J input of flip-flop 506. This signal sets flip-flop 506 so that when the test for empty signal TSTMTY is supplied to the K input thereof, the EMPTY signal is produced by flip-flop 506 and an error condition is indicated. The A=B signal also causes gate 509 to supply a control signal to state register 203 which is then reset. When register 203 is reset, PROM 204 is altered and the GRANT signal produced thereby is, effectively, removed and the GRANT condition is denied. Thus, the apparently successful requester is not granted access to the dynamic memory because of the error condition.

Conversely, if the compare circuit does not find equality, the new pointer which is supplied from counter 503 is written into memory 11 and supplies a new value to this memory address.

Referring to Table 1, there is shown, in short form, the operation of the circuit. The PROM address comprises five bits, viz. bits QA, QB and STATE. Bits QA and QB are identified in respective columns of Table 1 while the bits CDA3, CDA4 and CDA5 are the three bits shown in the column labeled STATE, i.e. the three bits from the STATE register. Moreover, the bits QA and QB refer to the current step. As will be seen, the next seven bits in the respective commands represent the contents of the PROM and are related to the bit position in the PROM. Thus, the put/get bit is equivalent to the CDB4 bit from the PROM. The ENCOMP signal is the compare enable signal which is supplied to compare circuits in register 206. The load (LOAD), increment (ZNC), write (WR) and grant (GRANT) signals are also identified as are the "NEXT QB" and "NEXT QA" signals. The NEXT QB and NEXT QA signals represent information which is directed to the next step in the circuit operation.

The first command listed is IDLE. This command is represented as all zeroes. In this condition, the affected devices are placed in the IDLE condition or status wherein no activity occurs. That situation indicates that a particular register machine has completed its activity and is, effectively, releasing the memory for accessing by another machine. The IDLE condition can be considered to be an "exit" condition or signal from the machine which was previously in control of the memory.

In a typical operation, reference is made to Table 1 and, in particular, to the command function entitled "NEXT PUT BLOCK". In this case, state register 203 produces output signals 01100 which are the signals CDA3, CDA4, CDA5, QB and QA, respectively. These bits represent the PROM address to determine and select the contents of that particular PROM address. The contents are produced from the PROM. The high-level (1) put/get signal indicates that a put operation is selected. The low-level (0) ENCOMP signal indicates that a comparison operation is not taking place at this time. A low-level (0) load signal (BSLOAD) indicates that the counter is to be loaded and the low-level (0) increment (BSINC) signal indicates that an increment is not to take place. A low-level (0) write signal (CDB4) indicates that a read operation is taking place. A low-level (0) GRANT signal (CDB3) shows that the requesting device has obtained or been granted access to the dynamic memory. The NEXT QB and NEXT QA signals are supplied to register 203 as the NXTS1 and NXTS0 signals, respectively, in order to provide the QA and QB signals therefrom. It is seen from the next line in Table 1 that the state register continues to produce the same signals at lines CDA3 through CDA5, QB remains zero but QA has been changed to a high-level signal as indicated by the NEXT QA signal on the preceeding line. The put/get signal (CDB3) remains the same as does the ENCOMP or compare signal. However, the output from the new address supplied to the PROM now produces a high-level load signal and a high-level increment signal wherein the contents of the counter are not loaded but are incremented by one. This type of operation continues in accordance with the terms noted in Table 1 until the signal reaches the 011 11 011 011 11 condition (i.e. the last signal in the NEXT PUT BLOCK.) The signals remain in this condition until an IDLE signal is produced to release the memory to the next successful requester.

vated while buffers 603 and 604 will, mutually exclusively, provide the signals A13–A15.

Thus, the address signals to memory 11 are provided by the memory address MUX in order to select the area of memory. This memory location is then accessed by the processing unit which has been selected by the BAMM. Of course, the RD, WR and MEMREQ signals from buffer 605 determine whether a memory re-

TABLE 1

| STATE | THIS STEP QB | THIS STEP QA | PUT/ GET | EN COMP+ | LOAD – | ZNC + | WR + | GRANT | NEXT STEP NEXT QB | NEXT STEP NEXT QA | COMMAND |
|---|---|---|---|---|---|---|---|---|---|---|---|
| 000 | 0 | 0 | X | 0 | 1 | 0 | 0 | 0 | 0 | 0 | IDLE |
| 001 | 0 | 0 | 1 | 0 | 0 | 0 | 0 | 0 | 0 | 1 | PUT POINTER (PRESENT BLOCK) |
| 001 | 0 | 1 | 1 | 0 | 0 | 0 | 0 | 1 | 0 | 1 | |
| 010 | 0 | 0 | 0 | 0 | 0 | 0 | 0 | 0 | 0 | 1 | GET POINTER |
| 010 | 0 | 1 | 0 | 0 | 0 | 0 | 0 | 1 | 0 | 1 | |
| 011 | 0 | 0 | 1 | 0 | 0 | 0 | 0 | 0 | 0 | 1 | NEXT PUT BLOCK |
| 011 | 0 | 1 | 1 | 0 | 1 | 1 | 0 | 0 | 1 | 0 | |
| 011 | 1 | 0 | 0 | 1 | 1 | 0 | 0 | 0 | 1 | 1 | |
| 011 | 1 | 1 | 0 | 1 | 1 | 0 | 1 | 1 | 1 | 1 | |
| 100 | 0 | 0 | 0 | 0 | 0 | 0 | 0 | 0 | 0 | 1 | NEXT GET BLOCK |
| 100 | 0 | 1 | 0 | 0 | 1 | 1 | 0 | 0 | 1 | 0 | |
| 100 | 1 | 0 | 1 | 1 | 1 | 0 | 0 | 0 | 1 | 1 | |
| 100 | 1 | 1 | 1 | 1 | 1 | 0 | 1 | 1 | 1 | 1 | |
| PROM ADDRESS | | | 7 | 6 | 5 | 4 | 3 | 2 | 1 | 0 | BIT POSITION IN PROM |
| | | | | PROM CONTENTS | | | | | | | |

X = DO NOT CARE

Similar operations apply for the PUT POINTER, GET POINTER, and NEXT GET BLOCK. That is, the machine moves, incrementally, through its repertoire until it achieves the last condition in the block and then awaits an exit or release command, i.e. the IDLE signal.

Figure 6:
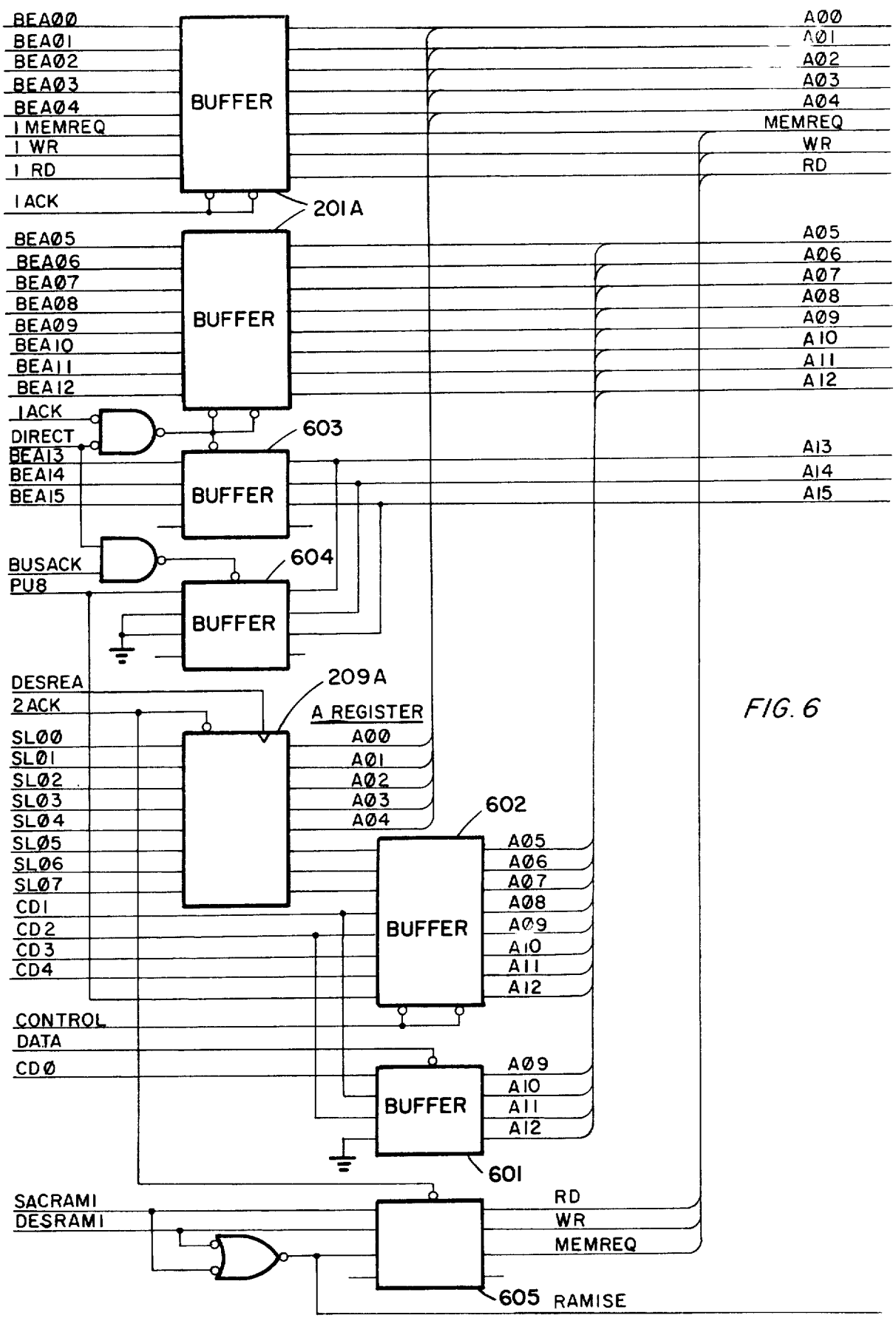
FIG. 6 is a detailed schematic diagram of the address multiplexer circuitry of the instant invention.

Referring now to FIG. 6, there is shown the logic circuitry referred to as the address MUX which is used with the micro-sequencer information wherein the address bits are concatenated with the bits produced by compare circuit 206 shown in FIG. 5 so that the microsequencer 14 can access the selected portions of memory 11. In particular, latch 209A toggles the low order address bits whereas the higher order address bits have already been set by the state register 203 through compare circuit 206. That is, the state register circuit 203 grants access to blocks of memory but the particular block of memory is enabled by the lower order address bits from latch 209A. More particularly, when data signals are to be applied to the memory bus 18, latch 206 (FIG. 5) supplies the signals A∅5–A∅8 while buffers 209A and 601 provide the signals A∅∅–A∅4 and A∅ 9–A12, respectively. Alternatively, when command (or similar) signals are to be provided for the memory bus 18 or other devices, buffer 209A provides signals A∅ ∅–A∅4 while buffer 602 provides the signals A∅5–A12. In either case, the bus 18 receives signals designated as A∅∅–A12.

The determination of which buffer (or buffer combination) is to supply the signals to bus 18 is determined primarily by CPU 13. The CPU supplies, inter alia, the signals CONTROL and DATA which selectively inhibit or activate the respective buffers.

In a similar manner, buffers 201A selectively provide signals to bus 18 in response to the control signals ACK and DIRECT. Likewise, either buffer 603 or buffer 604 will provide the signals A13–A15 as a function of the DIRECT and BUSACK signals. That is, the signals A∅∅–A12 are provided by buffers 201A when actiquest is active and whether a read or a write operation is involved.

Thus, there is shown and described a unique arbitration type circuit which is used to selectively connect a memory unit to one of a plurality of operating circuit units. The operating circuit units can be in the nature of computers, microprocessors or the like. The various operating units are assigned priorities in the event that two or more units simultaneously attempt to access the memory.

In the embodiment shown and described, particular circuit devices are incorporated. For example, integrated circuit chips or devices such as buffers, latches and so forth, are noted. However, it is possible that alternative devices can be used in the final or ultimate design. Moreover, circuit designs may be modified to permit different devices to be used. However, so long as the inventive concepts are included, these modifications are intended to be included in the description. That is, this description is intended to be illustrative not limitative. Rather, the scope of the invention is limited only by the scope of the claims appended hereto.

Having thus described a preferred embodiment of the invention, what is claimed is:

1. In combination,
   an information storage means,
   a plurality of operating units which selectively and mutually exclusively access said information storage means,
   each of said operating units is operative to produce an access signal in order to access said information storage means,
   request register means connected to said operating units to receive an access signal when at least one of said operating units requests access to said information storage means,
   arbitration means connected to said information storage means and to each of said operating units via said request register means in order to control the selective and mutually exclusive access to said information storage means by said operating units, said arbitration means includes priority resolution means for selecting only one of said operating units when a plurality of operating units simultaneously produce access signals in an attempt to access said information storage means, said priority resolution means includes a plurality of bistable circuits each of which is triggered by a separate access signal, and a priority bistable circuit connected to each of said bistable circuits in order to select the output of only one of said bistable circuits thereby to establish priority of said access signals, gating means connected to the outputs of said bistable circuits and to the input of said priority bistable circuit in order to trigger said priority bistable circuit as a function of the signals supplied to said gating means by said bistable circuits, and control gating means connected from said priority bistable circuit to said arbitration means to selectively activate said arbitration means to permit the exclusive access to said information storage means by only one of said operating units.

2. The combination recited in claim 1 wherein, each of said operating units comprises a computing device.

3. The combination recited in claim 1 wherein, said information storage means comprises a dynamic memory.

4. The combination recited in claim 1 wherein, said arbitration means includes separate interface means connected between said information storage means and all but one of said operating units.

5. The combination recited in claim 4 wherein, said one of said operating units is connected directly to said information storage means.

6. The combination recited in claim 1 wherein, each of said bistable circuit is a flip-flop.

7. The combination recited in claim 1 wherein, said request register means is selectively activated by priority bistable circuit.

8. The combination recited in claim 4 wherein, each said interface means comprises a control circuit bus.

9. The combination recited in claim 1 including, common bus means connected to supply signals to said information storage means from one of said operating units directly or via said arbitration means.

10. A priority selection circuit for selectively choosng which one of a plurality of requesting units can access a common apparatus comprising, a common bus connected to said common apparatus, all of said requesting units connected to said common bus, interface means connected between all but one of said requesting units and said common bus, request register means connected to said interface means to store a signal from the respective requesting unit when said respective unit seeks access to said common apparatus, said request register means includes a plurality of register devices each of which devices is associated with a separate requesting unit, each of said register devices operable to produce a signal, when driven by the associated requesting unit, to block the operation of the other devices, arbitration means connected to said request register means for determining the priority of requests in the event of simultaneous requests by a plurality of said requesting units, acknowledge means for acknowledging a request by said requesting means and the effecting of control thereby over the access to said common apparatus, granting means for indicating that one of said requesting means has been granted access to said common apparatus, and control means for controlling the operation of the requesting means which has obtained access to said common apparatus, said control means includes comparator means for comparing the addresses of the locations which are to be accessed by said requesting units.

11. The combination recited in claim 1 including, address selection means connected to said information storage means.

12. The combination recited in claim 11 wherein, said address selection means selectively permits direct or indirect addressing of said information storage means.

13. The combination recited in claim 1 including, read/write control means for determining whether information is to be supplied to or by said information storage means.

14. The circuit recited in claim 10 wherein, said common apparatus comprises a storage means.

15. The circuit recited in claim 10 wherein, said common apparatus comprises a memory unit.

16. The circuit recited in claim 15 wherein, said memory unit comprises a dynamic RAM.

17. The circuit recited in claim 10 wherein, said requesting units comprise at least two signal processing units.

18. The circuit recited in claim 17 wherein, said signal processing units each comprise a data processing unit.

19. The circuit recited in claim 18 wherein, at least one of said data processing units comprises a micro-sequencer unit.

20. The circuit recited in claim 10 wherein, said interface means comprises buffer register means.

21. The circuit recited in claim 10 wherein, said interface means includes buffer means.

22. The circuit recited in claim 10 wherein, said arbitration means includes a plurality of flip flops connected to receive signals from said request register means and to produce output signals to be supplied to said granting means representative of the signals received from said request register means.

* * * * *